Nov. 27, 1962 R. FENNEMA ETAL 3,065,951
CONDUIT GATE VALVE
Filed March 24, 1960 3 Sheets-Sheet 1

Inventors.
Richard Fennema, &
Andrew E. Anderson.
By Joseph O. Lange
Atty.

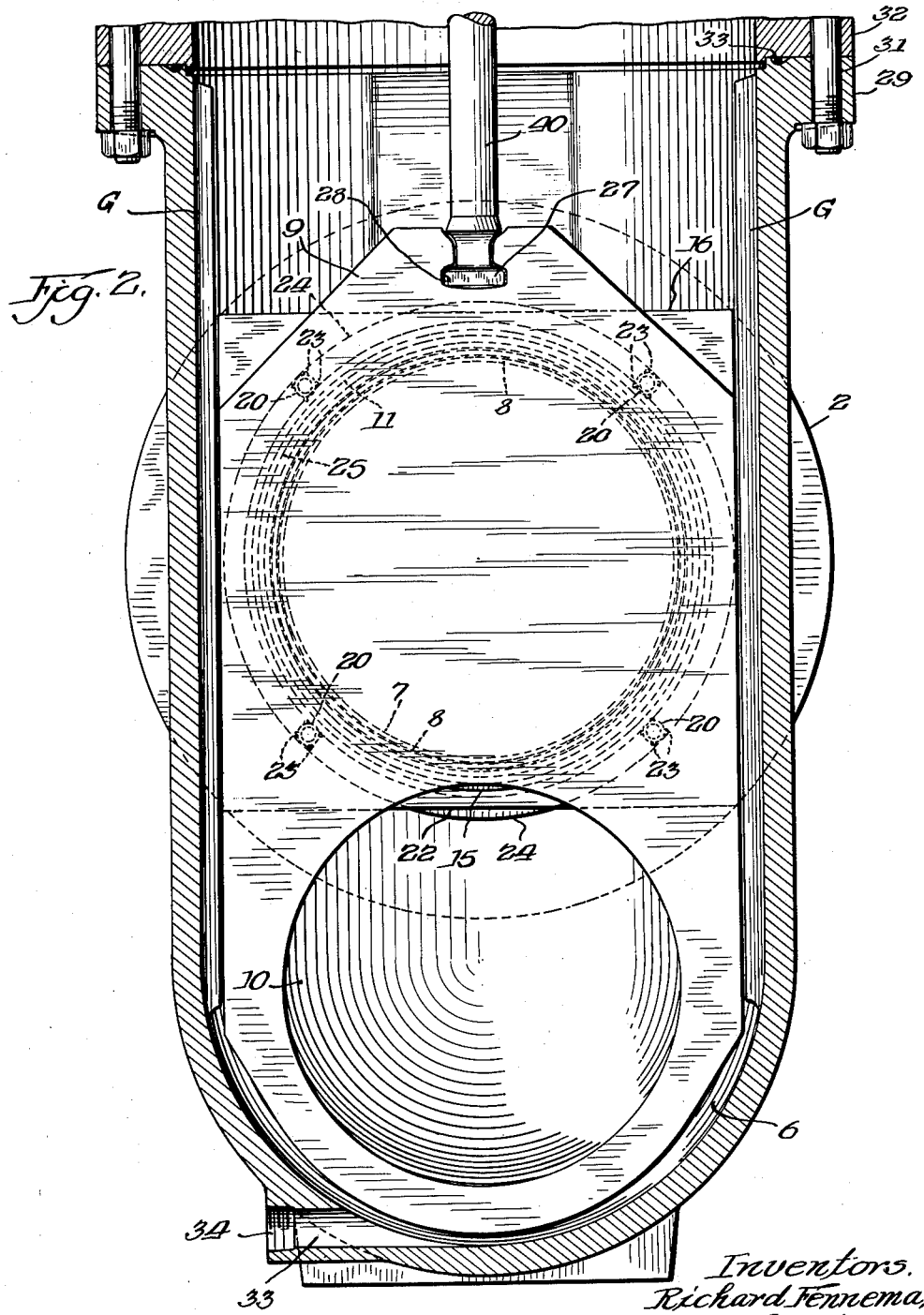

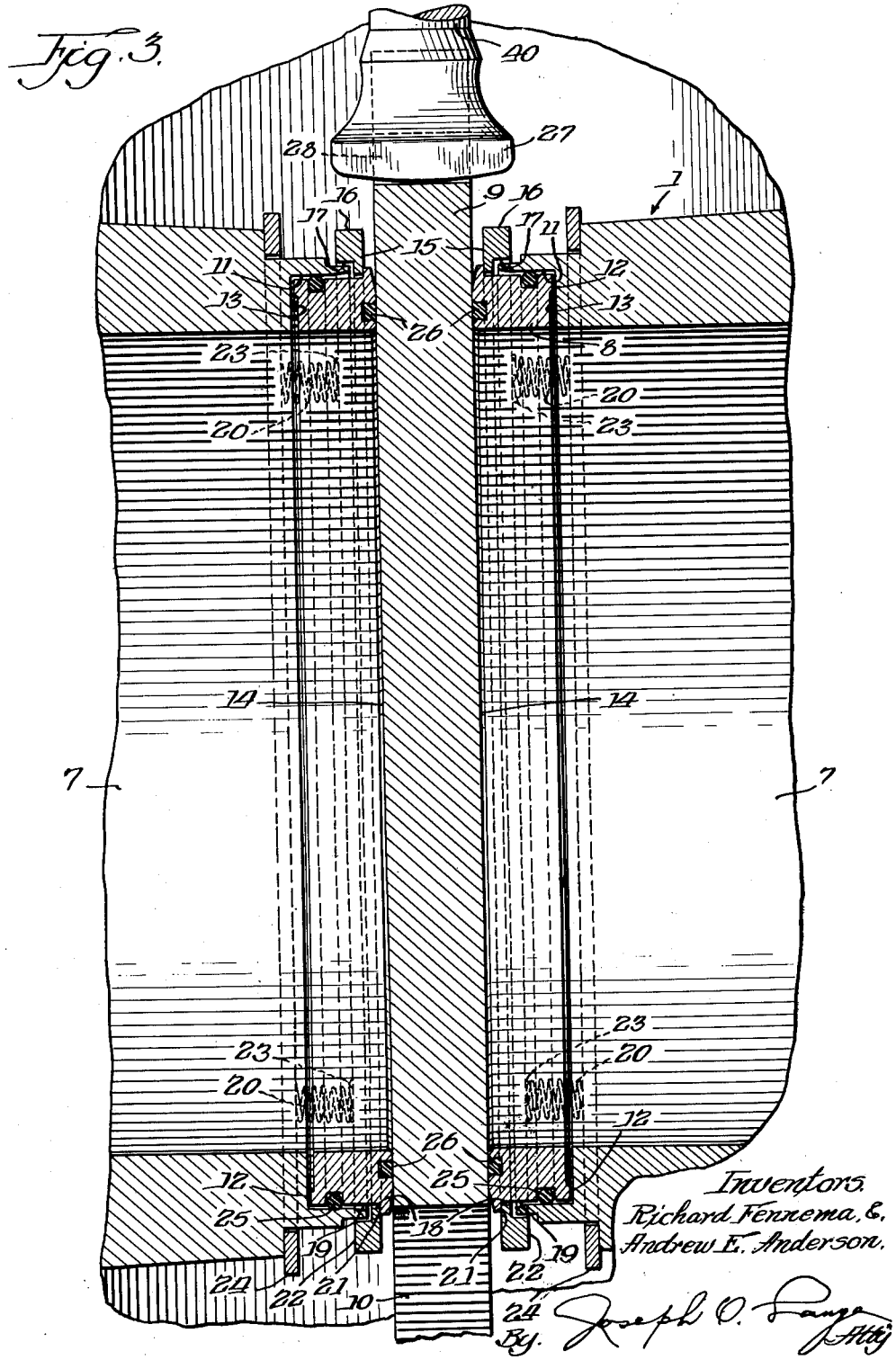

United States Patent Office 3,065,951
Patented Nov. 27, 1962

3,065,951
CONDUIT GATE VALVE
Richard Fennema, Chicago, and Andrew E. Anderson, Berwyn, Ill., assignors to Crane Co., Chicago, Ill., a corporation of Illinois
Filed Mar. 24, 1960, Ser. No. 17,305
1 Claim. (Cl. 251—172)

This invention relates generally to what is termed a conduit type of gate valve, and, more particularly, it is concerned with a valve seating structure in which a form of a flat plate type of closure member with parallel opposed seat contact surfaces is provided and in which the body seat rings of the valve are so arranged to permit the application of a predetermined degree of transverse pressure against the said seating surfaces through the application of force emanating from the line fluid pressure within the pipe line.

Another important object is to provide for a type of valve construction in which such application of the seating force is applied through a limitedly floating type of valve body seat ring, in which the said ring moves axially in response to line fluid pressure applied between its base portion and an opposed surface of the valve body or casing.

Another important object is to provide in a valve of this general type for a means of retaining the valve body seat ring resiliently against the valve closure member at such times in which the line fluid pressure is either substantially reduced or is visually non-existent.

Another important object is to provide for a construction in combination therewith for sealing the valve body seat rings effectively so as to retain the line fluid pressure.

A still further object is to provide for a valve seat construction having means for enclosing or retaining and guarding the sealing means against damage arising from improper or careless handling or abuse in the course of assembling the valve body seat rings and their retaining means within the valve casing.

Another object is to provide for a valve sealing construction in which easily assembled and conveniently replaceable parts may be readily employed economically while still effecting efficient fluid sealing and seating of the valve closure member on a variety of severe services.

Other objects and advantages will become more readily apparent upon proceeding with the following description read in light of the accompanying drawings, in which:

FIG. 2 is a sectional assembly view taken on the line 2—2 of FIG. 1; and

FIG. 3 is a fragmentary magnified sectional assembly view of the seating portion constituting our invention.

Figure 1:
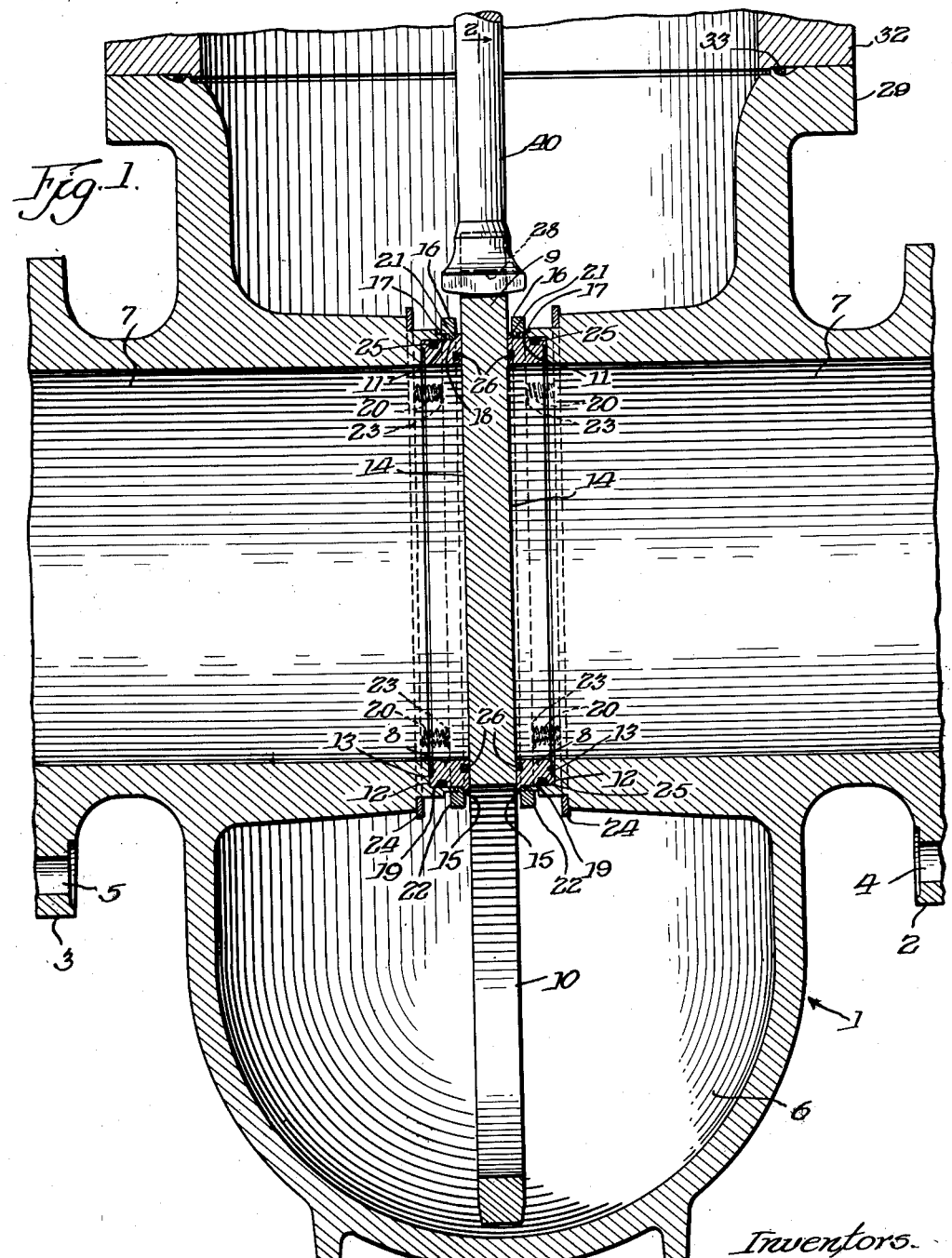
FIG. 1 is a fragmentary sectional assembly view of the preferred embodiment of a valve embodying our invention.

At the outset, it will be understood that the valve construction hereinafter described is generally of the conduit or pipe line valve of the type referred to and described generally in United States Patent No. 2,504,924, issued April 18, 1950. Therefore it is deemed unnecessary to set forth in detail the valve body or casing and the valve bonnet construction, the mode of operation of the valve following the pattern described in said patent. The operation obviously may be either manual, gear, motor, or fluid operated.

Referring now to the construction shown in FIG. 1, the valve body or casing is generally designated 1 and is shown with the usual pipe line connecting ends, such as the flanges 2, and suitably drilled as at 4 and 5 to receive the bolts (not shown) for attachment to the usual pipe line. The valve body is provided with a centrally disposed valve chamber 6 extending annularly around the seating portion of the valve and having the intercepting passage 7 therethrough.

At each of the inner termini of the passage 7, the body seat rings 8 mounted in oppositely disposed arrangement on each side of the ported closure member 9 and as illustrated each is received within the respective seating recesses 11. The body seat rings 8 at their outer end portions are provided with the annular raised portions 12 which predeterminately contact the shoulder surface limits 13 of the said body recess.

In the course of normal use, it will be understood that the valve chamber 6 is preferably packed with a lubricant having the consistency of a cup grease, which may be placed in the chamber 6 before valve assembly or else it may be fed into the body by the usual grease feed fitting and lubricating gun, both of which are not shown.

It will be appreciated that the body seat rings in order to effect a more substantial annular contact with the closure member parallel seating surfaces 14 oppositely disposed on the closure member 9 are made angularly shouldered as at 15, thus enabling the polygonally formed rings 16, apertured as at 17 and 18, to be passed over the body seat ring annular surface 19 whereby to respectively engage the undersurface annular shoulder portion 21 of each of the body seat rings 8. On the undersurface 22 of the polygonally formed rings 16, as indicated, and preferably tack-welded thereto in spaced-apart annular relation, as indicated at 23, the coil springs are securely mounted against transverse movement, shouldering against the annular washer 24 thereby to cause the member 16 to be forced axially against the shoulder surface 21 of the body seat ring 8 to hold the latter members against the respective surfaces 14 of the closure member 9. In order to allow for proper fluid sealing of the body seat ring within the body recess 11, the O-rings 25 are mounted in the usual manner, thus to effect the desired fluid tight seal therebetween.

It has been found that preferably by means of a dovetail attachment to the said seat ring, a suitable and preferably non-metallic seat ring may be used as indicated at 26 to provide the actual seating contact with the seating surface 14 of the closure member 9. Thus, as more clearly shown in the enlarged FIG. 3, the said non-metallic, and preferably ductile, material will be suitably compressed under seating load to form the actual sealing contact with the closure member surfaces 14 during the normal operation of the valve. The closure member 9 is moved in its reciprocating motion within the valve by means of the T-head of the stem 40 at 27, as shown more clearly in FIG. 2, engaging the recess portion 28 of the closure member 9. The valve body is provided at its upper end portion with the end flange 29 having the bolts 31 for attachment to the usual valve bonnet 32 and having in sealing relation thereto an O-ring 33.

At the lower end portion of the chamber 10 for drainage purposes, the port 33 provided with the threads 34 for engagement with a plug (not shown) may be used for clean-out purposes and drainage.

In actual operation, the reciprocally movable closure member 9 will at all times be engaged by the annular seat contact portions 26. The springs 20 bearing between the members 16 and 24 are so arranged as to effect such desirable fluid sealing contact. It should be appreciated as a novel contribution that such arrangement of the springs 20 annularly spaced apart around the easily removable assembly or unit described allows for a more compact construction than that heretofore employed, as, for example, shown and described in the above mentioned patent, or in U.S. Patent No. 2,778,600, granted January 22, 1957. At the same time, however, the instant construction allows for the unit to be easily and accurately assembled preliminary to the installation within the valve, either for repairs and/or replacement or in the initial assembly. The construction is durable, while at the same time, permitting renewal of the valve seats relatively economically.

While only a single embodiment has been shown and described, it will be appreciated that this is only for purpose of illustration and not of limitation and the spirit of this invention should be measured by the scope of the appended claim.

We claim:

In a conduit valve having a body with a passage therethrough defining an inlet and an outlet with valve seats defining a portion of said passage and a central valve chamber therebetween;

ported body seat rings having valve seat contact faces, the said seat rings being longitudinally movable in recessed portions of the said body relative to said inlet and outlet;

the said recessed portions of the body being defined by annular projections extending into said central valve chamber and enclosing said seat rings the annular limits of said projections extending into said valve chamber having outer reduced peripheral portions;

a reciprocally movable closure member slidably engaging contact faces of said body seat rings and being movable transversely to the said passage in said body to interrupt said latter opening;

the said seat rings having radially extending annular shoulder portions outwardly adjacent to said valve seat contact faces;

annular plates resiliently mounted for limited axial movement within said body on said body reduced annular projections and having apertured portions of reduced thickness loosely engaged by said shoulder portions of said body seat rings, the said annular plates being supported on said body reduced annular projections;

the said apertured portions of the plates of reduced thickness being of smaller diameter than the outside diameter of the shoulder portions of the seat rings whereby the said shoulder portions of said seat rings overlie and uniformly contact the said plates of reduced thickness perimetrally adjoining the apertured portions of said plates;

resilient means for said plates;

annular washers slidably mounted on said annular projections of said body recessed portions supporting said resilient means at that portion of said annular projections joining said body;

the said seat rings having shank portions receivable within the said recessed portions defined by the annular projections of the body;

sealing means cooperating with said shank portions and said body recessed portions to provide a fluid seal therebetween;

the said plates being limitedly slidable longitudinally on the shank portions of the said seat rings;

the length of said shank portions being at least equal to the depth of said annular projections of said body and providing an annular clearance between the shoulder portions of said seat rings and annular end limits of said projecting portions sufficient to receive said plates at said apertured portions of reduced thickness;

the said seat rings at the end opposite the said valve seat contact faces being provided with annular raised portions to effect an annular space between an inner peripheral portion of the shank portions of the said seat rings and the base of the recessed portions of the said body whereby to permit line fluid pressure to be applied therebetween and maintain said seat rings against said closure member;

the valve seat contact faces of said body seat rings being tapered outwardly peripherally in spaced relation from the ported portion of said seat rings in such a manner that only a portion of said contact faces contact the closure member;

the area of said contact faces of said body seat rings being substantially less in area than the cross-sectional area of the shank portions.

References Cited in the file of this patent

UNITED STATES PATENTS

| | | |
|---|---|---|
| 2,030,458 | McKellar | Feb. 11, 1936 |
| 2,861,771 | Bryant | Nov. 25, 1958 |
| 2,930,577 | Bredtschneider | Mar. 29, 1960 |

UNITED STATES PATENT OFFICE
CERTIFICATE OF CORRECTION

Patent No. 3,065,951                      November 27, 1962

Richard Fennema et al.

It is hereby certified that error appears in the above numbered patent requiring correction and that the said Letters Patent should read as corrected below.

Column 2, line 18, for "angularly" read -- annularly --.

Signed and sealed this 14th day of May 1963.

(SEAL)
Attest:

ERNEST W. SWIDER
Attesting Officer

DAVID L. LADD
Commissioner of Patents